T. R. TOGNA.
BOTTLE STOPPER FOR AUTOMATICALLY MEASURING AND DELIVERING LIQUID.
APPLICATION FILED JAN. 28, 1910.

1,036,381.

Patented Aug. 20, 1912.

2 SHEETS—SHEET 1.

Witnesses.
Henry S. Bell
John Brierley

Inventor
Turillo Ristori Togna
per
Attorney

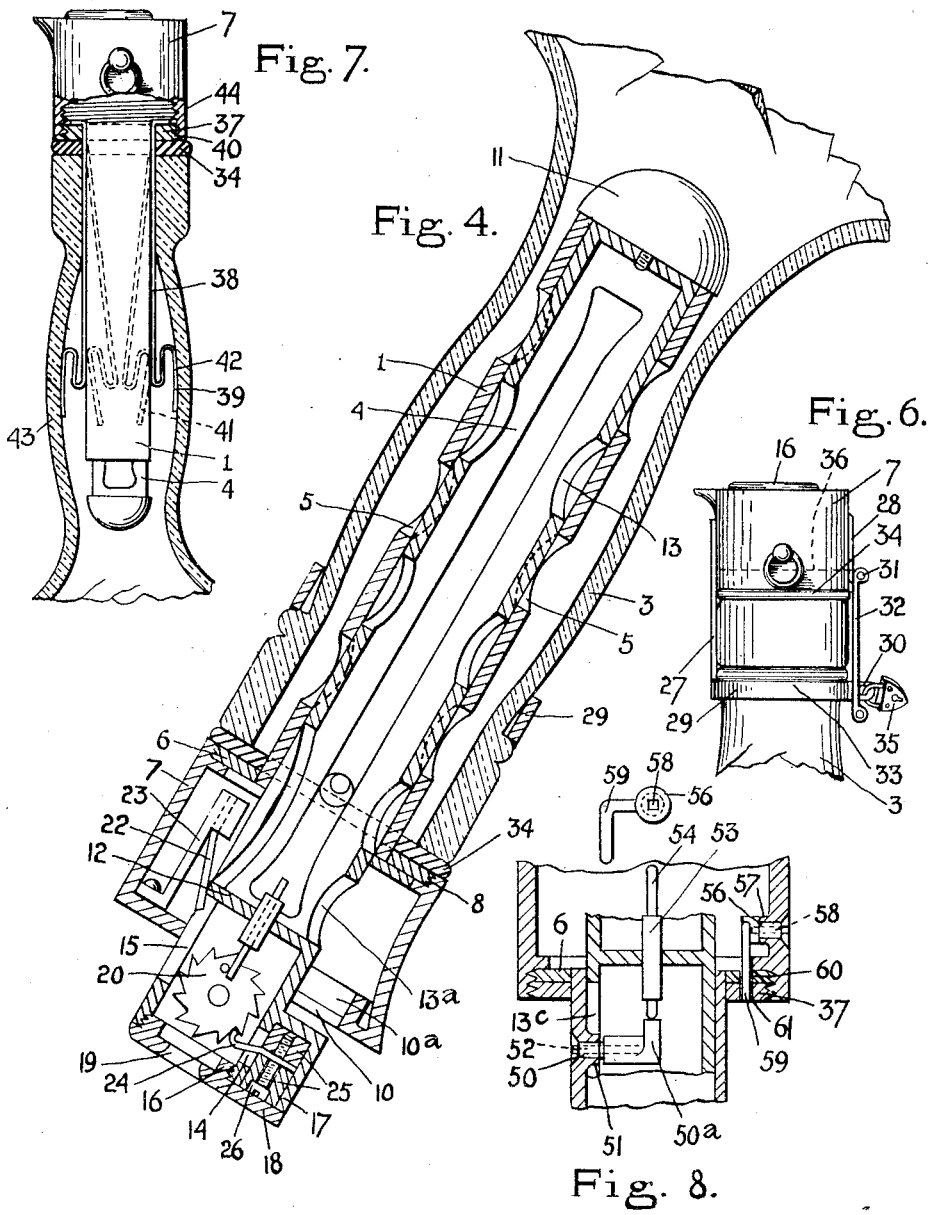

UNITED STATES PATENT OFFICE.

TURILLO RISTORI TOGNA, OF LONDON, ENGLAND.

BOTTLE-STOPPER FOR AUTOMATICALLY MEASURING AND DELIVERING LIQUID.

1,036,381.

Specification of Letters Patent.

Patented Aug. 20, 1912.

Application filed January 28, 1910. Serial No. 540,709.

*To all whom it may concern:*

Be it known that I, TURILLO RISTORI TOGNA, a subject of the King of Italy, residing at London, in the county of London, England, have invented a new and useful Bottle-Stopper for Automatically Measuring and Delivering Liquid, of which the following is a specification.

This invention relates to that class of bottle attachments by which fluid poured from a bottle is delivered in predetermined quantities and the number of said separate quantities registered upon a suitable dial or the like. Such devices as before referred to have heretofore been proposed, but none of those of which I am aware attain the objects hereinafter set forth as accomplished by my invention.

This invention consists in and has for its object the provision of a device of simple, neat and efficacious construction which will measure predetermined quantities of fluid discharged from any ordinary bottle in such manner that, notwithstanding that the bottle is of the non-refillable type when combined with my device, it can be re-filled and used continuously for the same purpose and with the same device; which will also simultaneously record the quantities discharged from an ordinary bottle; and, moreover, effect the operation automatically. I attain these objects by the mechanism illustrated in the accompanying drawings, in which—

Figure 1:
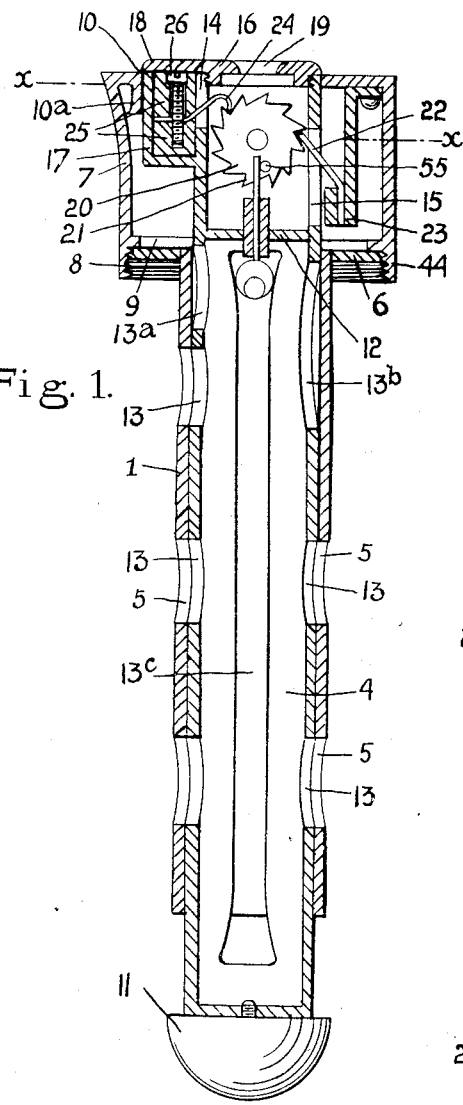
Figure 2:
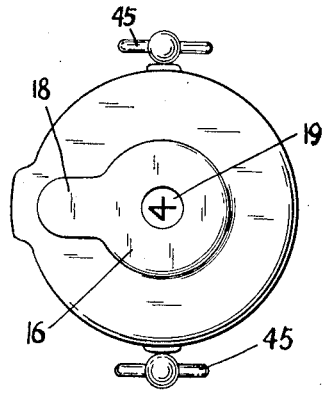
Figure 3:
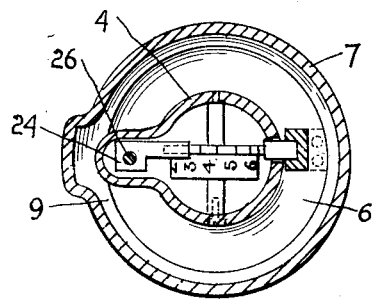
Figure 5:
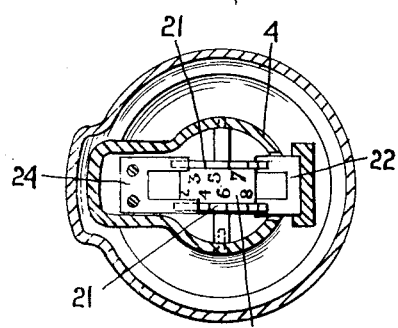

Figure 1 is a section taken vertically through a measuring device constructed in accordance with my invention. Fig. 2 is a plan showing the upper end. Fig. 3 is a section taken on the line x—x of Fig. 1. Fig. 4 illustrates the automatic action of the device during the act of pouring. Fig. 5 is a similar view to Fig. 3, illustrating a slight modification. Fig. 6 illustrates the method of attaching the device to a bottle of conventional shape and kind. Fig. 7 illustrates an alternative method of attaching the device to a bottle. Fig. 8 illustrates details.

The invention comprises a tubular part 1 of a diameter suitable for insertion into the smaller part of a bottle neck 3, of the smallest bottle commonly used for wines and spirits. The part 1 has in it a suitable number of equidistantly placed apertures 5. At the upper end of the part 1, and formed integral therewith, or attached thereto by screw-threads or other means, is a flange or disk 6. A casing 7, which may be of ornamental configuration or have its surface ornamented, is attached to the flange 6 by screw-threads 8, the flange abutting against an interiorly projecting flange 9. Other means of attachment, such as soldering, may, however, be employed. The casing has its upper end closed with the exception of an aperture 10, around the edge of which is an inturned flange 10$^a$.

A tubular part 4 is slidably fitted within the part 1, and is closed at its lower end by a disk or the like, to which is attached a weight 11. The capacity of the part 4 is such as to contain a predetermined quantity of fluid. Near its upper end the part 4 is closed by a disk or the like 12. Between the closed lower end of the part 4 and the disk or the like 12 are spaced apertures 13, 13$^a$ and 13$^b$, the apertures 13 corresponding to the apertures 5 in the part 1. Slots 13$^c$ may be made in the part 4, for lightness, to provide increased capacity, and to facilitate the entry of liquid into the lower end of the part 4. Above the closure 12 the part 4 has slots 14, 15, and is closed by a screw-cap 16. A small incasement 17 projects from the side of the part 4 and is preferably closed at its upper end by a projecting portion 18 of the cap 16. The cap has an aperture 19 for a purpose hereinafter mentioned.

In the upper end of the part 4 is pivoted for rotation a wheel 20 having a series of numerals around its peripheral surface and on one side of which, and revoluble therewith, is a ratchet 21. On one side of the ratchet, and projecting through the slot 15 into engagement with the ratchet teeth, is a pawl 22. The pawl may be held in position by a bracket 23 which depends from the top of the casing 7, or it may be otherwise secured in place. On the other side of the ratchet is a pawl 24 having its extremity hooked to engage the ratchet teeth, as shown. This pawl may be retained in position by any suitable means, but I have illustrated it as having one end clamped within the incasement 17 and between spacing pieces 25, by a screw 26 in such manner that it can project through the slot 14, into engagement with the ratchet teeth.

In Fig. 5 a slight modification of the registering mechanism is shown, wherein the wheel 20 is of sufficient width to accommodate two rows of numerals, and it has a ratchet 21 on both sides. By placing the numerals on one row intermittently of those in the other row I am enabled to inscribe a large number of them on a wheel of small circumference, and to avoid correspondingly increasing the number and consequently decreasing the size of the teeth on the ratchet (which would render them liable to become ineffective at times) I employ two ratchets with teeth set intermittently. The pawls 22 and 24 are each provided with two tongues to engage the respective ratchets. This mechanism is not new, and I do not claim it exclusively, but only as applied to and in combination with my measuring device. A stop, which may be of any desired construction, is provided. In the present instance it is illustrated as consisting of a stem 50 rotatively mounted in a boss 51 on the tubular part 1, having an angularly shaped key-hole 52, and an eccentric 50$^a$ at its inner end. Secured in the disk 12 is a tubular guide 53 for a stem 54 which rests upon the periphery of the eccentric, and can thereby be raised into position to be engaged by a pin 55 projecting from the face of the wheel 20. Movement of the part 4 is not prevented by the stem 50, because it projects through one of the slots 13$^c$.

One form of the means for attaching the device to a bottle consists of two strips of metal 27, 28, which are secured by any suitable means to the outer surface of the casing 7. A band 29, of flexible metal, having its extremities bent outward and perforated to form a pair of eyes 30, is attached to or formed integral with the metal strip 27. The other strip, 28, has hinged to it at 31 a hasp 32 adapted to pass over the eyes 30 and hold them together after the band has been sprung around the neck of the bottle below the shoulder 33 which is formed on bottles of the kind customarily used. A rubber or other resilient washer 34 is passed over the tubular part 1 into contiguity with the flange 6, so that when said part is inserted into the neck of the bottle, the washer will be compressed between said flange and the mouth of the bottle when the hasp is brought down into position to pass over the eyes 30.

A padlock or other device 35 serves to prevent unauthorized removal of the device. If desired, the strip of metal 27 may form part of, or be secured to, a band 36 (indicated by broken lines) to which the hasp 32 is hinged, as at 31; the band being secured to the casing 7 by soldering, screws, or other means.

Alternative means of attachment consists of a disk 37 to which is riveted or otherwise secured a pair of spring arms 38 having curved ends 39. The disk has screw-threads 40 on its edge. The rubber or like washer 34 having been placed upon the edge of the mouth of the bottle the arms 38 are passed through the washer and into the bottle neck. The part 1 of the measuring device is then passed through the disk 37 and between the spring arms 38, the parts 39 of which are thereby pressed outward from the position indicated at 41 into the position shown at 42 in the wider part 43 of the bottle neck. The disk 37 having had the depending internally screw-threaded part 44 of the casing 7 adjusted over it, and the arms 38 being in distended position too far apart to be drawn through the narrower part of the opening of the bottle neck, the measuring device is thus secured to the bottle.

In order to prevent unauthorized removal of the casing 7 from the disk 37 I provide a catch of suitable construction. In the present instance it is shown as consisting of a stem 56, revolubly fitting in a boss 57 projecting from the interior of the casing 7, and having an angularly shaped key-hole 58 and an outwardly and downwardly projecting arm 59. By means of a key the stem 56 can be turned into such position that the arm 59 will enter corresponding apertures 60, 61, respectively, in the disk 6 and disk 37.

A pair of rings 45 may be secured to the casing 7 to facilitate removal of the device from the bottle, to suspend it when out of use, or for the purpose of ornament.

The measuring device having been attached to a bottle containing liquid, in either of the ways described, and "zero" on the wheel being visible through the aperture 19, the parts will be in the position shown in Fig. 1, the apertures 5 and 13 being coincident. When, however, the bottle is partly inverted as in the act of pouring liquid therefrom, liquid will flow quickly into the neck of the bottle and fill the interior of the tubular part 4 during the initial part of the movement. The weight 11 then coming into a more vertical position will cause a rapid sliding movement of the part 4 thus closing the apertures 5 and 13 by bringing them out of coincidence. The liquid within the part 4 will then flow out through the apertures 13$^a$ and 10, the incasement 17 having been moved beyond the opening 10 by the latter part of the movement. When the bottle is returned to upright position the part 4 will fall by gravity into its initial position and, the pawl 22, coming into contact with the ratchet 21, the latter will be revolved a stage equal to the distance between two teeth, thereby turning the wheel 20 into position to render the numeral 1 visible through the opening 19. Reverse movement of the wheel 20 is prevented by the pawl 24. The flange 10$^a$, providing a comparatively large surface between the parts 17 and 7 serves to prevent liquid from leaking through the opening 10 before the bottle has been inclined sufficiently to cause the incasement 17 to entirely leave said opening by which time the ratchet will have moved the required distance above the pawl 22 to be operated thereby when resuming normal position. When the total number of measured quantities indicated by the numerals on the wheel 20 have been poured out, the pin 55 will be in contact with the stem 54 of the stop and further rotation of the wheel 20 will be prevented. The stop is for the purpose of preventing one or more quantities being taken from the bottle and the wheel being subsequently rotated in any unauthorized manner until it again shows a numeral indicating a less number of measured quantities than those actually poured from the bottle.

From the foregoing it will be understood that I have provided a device which not only fulfils the objects hereinbefore mentioned, but which will be found particularly useful in restaurants where time saving is a necessity; the device enabling the attendant to present the bottle to customers and from which they can help themselves without instructions as to the method of using it. This method has generally been found pleasing to the customer while saving time and affording a check on the amount of wine or liquor consumed.

What I claim as my invention and desire to secure by Letters Patent, is:—

1. In a device of the class described, in combination, a casing, means for securing the same to the neck of a bottle, said casing being provided with an opening adapted to permit the passage of the liquid, a tube secured to the casing and adapted to extend within the neck of the bottle, said tube being provided with apertures, a second tube slidingly mounted within said first tube, said second tube having a closed lower end and being provided with apertures adapted to register with the apertures in said first tube when the device is in its normal or operative position and adapted to be moved out of registry with the apertures in said first tube when the device is in its alternate or inverted position, said sliding tube being provided with an opening adapted to permit the liquid to flow from the tube into the casing when the device is in its inverted position, and means actuated by the movement of the sliding tube to register the number of its movements.

2. In a device of the class described, in combination, a casing, means for securing the same to the neck of a bottle, said casing being provided with an opening adapted to permit the passage of the liquid, a tube secured to the casing and adapted to extend within the neck of the bottle, said tube being provided with apertures, a second tube slidingly mounted within said first tube, said second tube having a closed lower end and being provided with apertures adapted to register with the apertures in said first tube when the device is in its normal or operative position and adapted to be moved out of registry with the apertures in said first tube when the device is in its alternate or inverted position, said sliding tube being provided with an opening adapted to permit the liquid to flow from the tube into the casing when the device is in its inverted position, and means actuated by the movement of the sliding tube as it passes from its alternate position to its normal position to register the number of its movements.

3. In a device of the class described, in combination, a casing, means for securing the same to the neck of a bottle, said casing being provided with an opening adapted to permit the passage of the liquid, a tube secured to the casing and adapted to extend within the neck of the bottle, said tube being provided with apertures, a second tube slidingly mounted within said first tube, said second tube having a closed lower end and being provided with apertures adapted to register with the apertures in said first tube when the device is in its normal or operative position and adapted to be moved out of registry with the apertures in said first tube when the device is in its alternate or inverted position, said sliding tube being provided with an opening adapted to permit the liquid to flow from the tube into the casing when the device is in its inverted position, registering means carried by said sliding tube, and means for actuating said registering means as said sliding tube moves from one of its positions to the other of its positions.

In testimony whereof I have signed my name to this specification in the presence of two subscribing witnesses.

TURILLO RISTORI TOGNA.

Witnesses:
 CINO CORSINI,
 LORENZO MAURICE.

---

Copies of this patent may be obtained for five cents each, by addressing the "Commissioner of Patents. Washington, D. C."